(12) United States Patent
Fessler et al.

(10) Patent No.: US 12,536,842 B2
(45) Date of Patent: Jan. 27, 2026

(54) DECODER FOR A RACE TIMING SYSTEM

(71) Applicant: Race Result AG, Pfinztal (DE)

(72) Inventors: Manuel Fessler, Neuenbürg (DE); Nikias Klohr, Stutensee (DE); Martha Augsburger, Pfinztal (DE)

(73) Assignee: Race Result AG, Pfinztal (DE)

( * ) Notice: Subject to any disclaimer, the term of this patent is extended or adjusted under 35 U.S.C. 154(b) by 0 days.

(21) Appl. No.: 19/102,135

(22) PCT Filed: Aug. 7, 2023

(86) PCT No.: PCT/EP2023/071845
§ 371 (c)(1),
(2) Date: Feb. 7, 2025

(87) PCT Pub. No.: WO2024/033317
PCT Pub. Date: Feb. 15, 2024

(65) Prior Publication Data
US 2025/0259482 A1    Aug. 14, 2025

(30) Foreign Application Priority Data

Aug. 8, 2022    (EP) .................................... 22189297

(51) Int. Cl.
*G07C 1/24*     (2006.01)
*G06F 1/20*     (2006.01)
*G06K 7/10*     (2006.01)

(52) U.S. Cl.
CPC .............. *G07C 1/24* (2013.01); *G06F 1/203* (2013.01); *G06F 1/206* (2013.01); *G06K 7/10316* (2013.01)

(58) Field of Classification Search
CPC ........... G07C 1/24; G06F 1/203; G06F 1/206; G06K 7/10316
See application file for complete search history.

(56) References Cited

U.S. PATENT DOCUMENTS

2004/0257294 A1    12/2004    Bernard et al.
2006/0002079 A1    1/2006     Xu et al.
(Continued)

FOREIGN PATENT DOCUMENTS

EP    3 832 520 A1    6/2021
JP    H08-57104 A     3/1996

OTHER PUBLICATIONS

Paek et al., Multiple Reader Algorithm for Sports Timing Systems and Sports Timing Systems and Its Application at Low Frequency Bandwidth, Dec. 2013, China Communications, p. 16-24 (Year: 2013).*

(Continued)

*Primary Examiner* — Mi'Schita' Henson
(74) *Attorney, Agent, or Firm* — Foley & Lardner LLP

(57) ABSTRACT

The present invention relates to a decoder (18) for a race timing system (16), comprising: a reader interface (24) for receiving detections of sports timing transponders (14) passing an antenna (106); a cable connection interface (26) for connecting a network cable and/or a computer interface cable; a user interface (28) for providing configuration feedback to a user; a processing unit (84) for determining passing times of participants (10) in a sports event based on the detections; and a housing (30) for protecting the processing unit from environmental impact, wherein the user interface is arranged on an outside of the housing for providing user access and the cable connection interface is arranged under a protective flap (42) that is configured to provide user access to the cable connection interface in an open state and to shield the cable connection from environmental impact in a closed state. The present invention further relates to a race timing system (16).

15 Claims, 12 Drawing Sheets

(56) References Cited

U.S. PATENT DOCUMENTS

| | | |
|---|---|---|
| 2006/0217232 A1 | 9/2006 | Kondrat et al. |
| 2012/0072172 A1 | 3/2012 | Howell |
| 2021/0166498 A1* | 6/2021 | Klohr .................. H01Q 9/0407 |
| 2025/0259024 A1* | 8/2025 | Hofmann ........... G06K 7/10356 |

OTHER PUBLICATIONS

Perez-Diaz-de-Cerio et al., A Low-Cost Tracking System for Running Race Applications Based on Bluetooth Low Energy Technology, 2018, Sensors, 18(3), pp. 1-17 (Year: 2018).*
Decision to Grant in EP 22189297.9 dated Nov. 7, 2024 (2 pages).
International Search Report and Written Opinion on PCT/EP2023/071845 dated Oct. 23, 2023 (18 pages).

* cited by examiner

DECODER FOR A RACE TIMING SYSTEM

CROSS-REFERENCE TO RELATED APPLICATIONS

This application is a U.S. national phase application under 35 U.S.C. § 371 of International Application No. PCT/EP2023/071845, filed Aug. 7, 2023, which claims the benefit of and priority to European Patent Application No. 22189297.9, filed Aug. 8, 2022, both of which are incorporated herein by reference in their entirety.

BACKGROUND

The present invention relates to a decoder for a race timing system. The present invention further relates to a race timing system for detecting passing sports timing transponders in a sports event.

In the field of timing at sports events, for example running events, marathons, bicycle races, skiing races, car races, horse races or others, timing of participants' start, finish, and split times plays an important role. In prevailing timing systems, oftentimes a person, a vehicle or an animal, whose time is to be measured, carries a radio element (sports timing transponder, in particular an active or passive RFID tag) for non-contact, automated timing. Runners, for instance, may carry radio elements that are attached to shoe laces or to a bib number for being pinned to the participant's shirt or pants.

At start, finish and split time positions along a track, measuring points are provided to detect the presence of the radio element and determine a passing time, i.e. a moment in time at which the radio element passes the measuring point. For this purpose, a measuring point usually comprises a corresponding antenna and data processing means to process the received data. Usually, the determined passing times for the participants are then communicated to a central evaluation point for access by the organizers of the event and the participants.

In this context, a sports timing transponder particularly designates a radio element that is able to transmit and receive radio signals. A sports timing transponder may refer to a passive RFID tag that has no integrated energy source or to an active RFID tag with an included battery. In the case of a passive RFID tag, the sports timing transponder is usually activated, i.e. read out, upon passing a measuring point, by a corresponding RFID reader that can determine the passing time based on one or multiple reads. In the case of an active RFID tag, usually an inductive loop is detected by the tag and a passing time is calculated in the tag based on multiple detections to be transmitted to a corresponding apparatus for further processing and/or evaluation.

Current sports timing systems for passive RFID tags usually include a suitcase-sized apparatus (usually referred to as decoder) comprising the RFID reader. This decoder is connected to a corresponding RFID antenna. The antenna is often a ground antenna that is integrated in a cable channel, or a side antenna that is positioned at a side of a race track on a tripod. Apart from the RFID reader, which is usually an RFID reader originally intended for logistics applications, current decoders include at least a battery, a processing module and different options for communication.

In this context, EP 3 832 520 A1 relates to an apparatus for determining a passing time of a passive RFID sports timing transponder, comprising: a housing for protecting the apparatus from environmental effects; an RFID reader unit connected to an RFID antenna for remotely determining an identity and a passing time of the sports timing transponder upon passing the apparatus; a location unit for determining a location of the apparatus; a mobile communication unit connected to a mobile communication antenna for transmitting the identity and the passing time of the sports timing transponder and the location of the apparatus to a remote processing unit; and a neighbor communication unit for communicating with another similar apparatus in an immediate spatial vicinity to synchronize operation of the RFID reader unit and an RFID reader unit of the other similar apparatus to avoid interference, wherein the RFID reader unit, the RFID antenna, the location unit, the mobile communication unit and the neighbor communication unit are integrated in a common printed circuit board that is mounted within the housing. The present invention further relates to a system for timing a sports event.

Relevant drawbacks of current solutions are oftentimes their limited flexibility with respect to varying requirements at different events. Usually, a timer, i.e. a person providing timing services, is in need of hardware that can be used for different application scenarios. In particular, some events make use of active RFID-tags whereas others make use of passive RFID-tags. Furthermore, the situation at the start, finish and split-time positions is often not known in advance so that a flexible set-up needs to be possible. The width of the race track may vary and may not be known in advance. In addition, a quick and easy set-up at the location of the sports event is needed. Often unskilled workers are thereby setting up the system that have no or little specific experience so that a simple set-up is essential. Still further, since usual application scenarios are outdoors, it is essential that weather conditions, such as high or low temperatures, rain or sunlight, do not hamper the application of the timing system.

SUMMARY OF THE INVENTION

In view of the above, the present invention addresses the problem of providing a robust, flexible-to-use and easy-to-set up solution for race timing. In particular, it is desired to provide a decoder that can be operated in outdoor conditions and that provides a high flexibility with respect to varying requirements at different sports events. Furthermore, it is desired to provide an easy and comfortable-to-use race timing system.

To solve this problem, a first aspect of the present invention relates to a decoder for a race timing system, comprising:
- a reader interface for receiving detections of sports timing transponders passing an antenna;
- a cable connection interface for connecting a network cable and/or a computer interface cable;
- a user interface for providing configuration feedback to a user;
- a processing unit for determining passing times of participants in a sports event based on the detections; and
- a housing for protecting the processing unit from environmental impact, wherein
the user interface is arranged on an outside of the housing for providing user access and the cable connection interface is arranged under a protective flap that is configured to provide user access to the cable connection interface in an open state and to shield the cable connection from environmental impact in a closed state.

In another aspect the present invention relates to a race timing system, comprising:
- a decoder as described above, and
- a detection assembly including an antenna and a calculation unit connected to the antenna, said antenna and calculation unit being positioned in a channel element, wherein
- said calculation unit includes RFID reader circuitry.

Preferred embodiments of the invention are defined in the dependent claims. It shall be understood that the claimed race timing system has similar and/or identical preferred embodiments as the claimed decoder, in particular as defined in the dependent claims and as disclosed herein.

The present invention is based on the idea of combining an externally arranged and permanently accessible user interface with a cable connection interface that is arranged under a protective flap to be protected from environmental impact. Consequently, it becomes possible that a network cable and/or a computer interface cable are connected to the decoder by means of a regular plug. It is not necessary to make use of a connector being suitable for outdoor operations and being shielded against water and other impacts. Usually, the users on site at a sports event want to use their regular equipment to connect to the decoder and to further process the detections.

A reader interface allows connecting the decoder to equipment for detecting sports timing transponders. A cable connection interface allows connecting the decoder to a computer network or to a computer to establish a connection to further process the detections. A user interface is provided to provide configuration feedback to the user. For instance, the user might be provided with information regarding current detections or also regarding configuration parameters of the decoder or of equipment connected to the decoder. The processing unit of the decoder is housed in a housing and thereby shielded from environmental impacts such as rain, splash water, sun, dust etc.

In comparison to previous approaches in which both the cable connection interfaces as well as the user interface are arranged under a protective flap, the decoder of the present invention provides a better usability. In particular, in harsh environmental conditions such as rain or snow or others, failures resulting from water entering into the decoder housing via one of the connected cables are prevented. The reliability of the race timing system is improved. It is assured that the decoder and the race timing system can be used in all weather conditions. In addition, an easy and fail-safe operation of the decoder in the race timing system is possible, also enabling unskilled workers to provide timing services.

In an embodiment the reader interface includes a passive RFID connector for connecting to an RFID reader circuitry having an antenna connected thereto and for receiving detections of passive sports timing transponders from the RFID reader circuitry. The antenna does not form part of the decoder. The passive RFID connector preferably corresponds to a cable connector arranged on the outside of the housing. Additionally or alternatively, the reader interface includes a loop antenna connector for connecting to an induction loop for communicating with active sports timing transponders. For instance, it is possible that an electric field for detection by active sports timing transponders is induced and the reader interface further includes a wireless communication antenna for communicating with said active sports timing transponders. Said loop antenna connector preferably corresponds to a cable connector arranged on the outside of the housing. In other words, it is possible to connect the decoder to an RFID reader arranged externally or to directly connect the decoder to an induction loop for making use of active RFID sports timing transponders. Usually, corresponding cables are arranged on the outside of the housing for easy access. Usually, such cable connectors are waterproof or water-resistant.

In another embodiment the protective flap is configured to cover an upper portion of a front side of the housing and is pivotably hinged about a pivot axis substantially parallel to a top side of the housing and a front side of the housing, said pivot axis preferably lying in a top side plane of the housing. Additionally or alternatively, the protective flap has a curved shape, in particular spanning an angle of about 90°. By making use of a protective flap that is hinged about an axis in a top side plane of the housing and that has a curved shape, a larger dimensioned cable connection interface becomes possible. This allows easy access and comfortable operation.

In another embodiment the user interface includes a water-resistant display, preferably a monochrome LCD display and/or a display with a multicolor screen backlighting. Additionally or alternatively, the user interface is arranged on a top side of the housing. The use of a water-resistant display makes it possible to show a range of different information to the user independently of weather conditions. A monochrome LCD display provides for a good readability even in sunlight conditions. A multicolor screen backlighting makes it possible to provide the user with additional information, e.g. about a current position of the respective decoder. For instance, it may be indicated that the decoder is located at a specific split-time position by attributing a color to this split-time position. This allows for an efficient communication between the operating personnel. The arrangement of the user interface on the top side of the housing provides for easy access and good readability.

In an embodiment the housing and/or the protective flap includes a locking mechanism having a magnet for magnetically holding the protective flap in the closed state. This magnet-based locking mechanism allows for easy access in combination with a secure locking of the protective flap in the closed state. Connection of cables to the cable connection interface becomes easy and efficient.

In an embodiment a lower portion of the protective flap is configured to cover a section of the housing below the cable connection interface in the closed state. Additionally or alternatively, the housing includes a brush extension for reaching to the lower portion of the protective flap in the closed state for allowing a network cable and/or a computer interface cable to pass through the brush extension to connect to the cable connection interface albeit maintaining a barrier for environmental impact, in particular splash water. The protective flap reaches lower than the cable connection interface so that a physical barrier for water is provided. Water will drip down the protective flap in the closed state and not be able to reach the cable connection interface. Additionally or alternatively, the brush extension assures that no water can run along a cable and enter the cable connection interface due to a capillary effect. Robustness against rain, splash water and/or dust is further improved.

In an embodiment the housing includes a top connection portion in an area of the top side of the housing and a matching bottom connection portion in an area of the top side of the housing and a matching bottom connection portion in the area of a bottom side of the housing for allowing a stackability of multiple decoders. Preferably, the housing includes a recess in the area of the bottom side of the housing matching a space for opening and closing a protective flap of a below-stacked further decoder. Stacking the decoders provides for an efficient storability of multiple decoders. If, in this stacked state, it is still possible to access the cable connection interface by opening the protective flaps, an efficient charging, reprogramming, software updating etc. can be allowed. For this, the protective flap of one decoder opens into the recess of the above-stacked decoder. Consequently, all protective flaps of multiple decoders in a stack of decoders can be opened.

In an embodiment the housing includes two battery compartments for housing two batteries and a battery fixation mechanism configured to fixate a battery in a first battery compartment while allowing a replacement of a battery in a second battery compartment. The battery fixation mechanism includes two further protective flaps for closing the two battery compartments and a closing element for securing the further protective flaps in a closed state.

The closing element is configured to simultaneously close both further protective flaps to fixate two batteries in the two battery compartments in a first position and selectively close one of the further protective flaps while opening the other of the further protective flaps in a second and third position to fixate one battery while allowing a replacement of the other. The closing element is preferably pivotable between the first, second and third position. The use of two batteries makes it possible that one battery is replaced during runtime. While replacing one battery the other can power the decoder. Also, redundancy can be provided. By making use of protective flaps for closing the two battery compartments, robustness against environmental impacts is improved. The batteries are shielded from water, dust etc. The closing element assures that only one protective flap can be opened at each point in time so that continuous power supply of the decoder is assured. If only one battery compartment can be opened at a time, it is made sure that always one battery remains in the battery compartment to provide power to the decoder. This functionality can preferably be implemented in the form of a pivotable closing element. This allows for an efficient implementation and a good usability.

In an embodiment the two further protective flaps are transparent to allow the user to visually assess a presence and/or a charging state indication of batteries in the two battery compartments. Additionally or alternatively, the two further protective flaps are arranged on a same side of the decoder as the protective flap. Transparent further protective flaps allow assessing whether one or two batteries are inserted in the battery compartments. For instance, batteries may be used that provide a charging state indication. This can be read through a transparent further protective flap by a user so that an efficient assessment of a charging state of a battery becomes possible. If the further protective flaps are arranged on the same side of the decoder as the protective flap, it becomes possible to store the decoders in a stack of decoders, and to connect cables to the cable connection interface in addition to replacing or accessing the batteries simultaneously. This arrangement thereby improves the usability and the efficiency when handling multiple decoders.

In an embodiment the decoder includes a ventilation unit for ventilating an inside of the housing with outside air. A ventilation strength is controlled based on a reading of a temperature sensor and a humidity sensor included in the decoder. By making use of readings from both the temperature sensor and the humidity sensor, a weather-adapted control of the ventilation unit becomes possible. For instance, if decoders are used in a skiing event and are stored in a comparably warmer storage before being placed outside in the snow, it may make sense to ventilate the inside in spite of a low temperature to remove humidity from condensation water from the inside of the housing. This improves the robustness against changing weather conditions and increases a decoders lifetime.

In an embodiment, the decoder includes a ventilation outlet connecting an inside of the housing with an outside and a ventilation inlet connecting the outside with the inside. The ventilation outlet and the ventilation inlet are arranged under the protective flap. The protective flap preferably includes a barrier protrusion for forming an airflow barrier between the ventilation outlet and the ventilation inlet under the protective flap in the closed state. Particularly, this barrier protrusion can include an opening for a plug of a power cable so that the plug closes the barrier protrusion when plugged in. The outlet and the inlet are shielded from environmental impacts by being placed under the protective flap. Robustness of the decoder is improved. The barrier protrusion assures that no or only little direct airflow between the inlet and the outlet occurs under the protective flap that could reduce efficiency of the ventilation. The opening for the power plug is closed when the power cable is plugged in. In other words, the airflow between the inlet and the outlet is particularly reduced when the power plug is plugged in and ventilation is necessary since batteries can be charged etc.

In an embodiment the decoder includes an RFID chip for carrying information on the decoder, in particular an identification information for identifying the decoder. Preferably, the RFID chip is programmable via the processing unit. The use of an additional RFID chip provides the advantage that a contact-free detection of the decoder becomes possible. For instance, if multiple decoders are stored in a storage, an inventory can easily be performed. By programming the RFID chip, it is thereby possible to provide additional information. For instance, it may be possible to assess a charging state of batteries or a software version in the inventory without requiring the decoders to power up. Energy can be saved and usability can be improved.

In an embodiment the decoder includes a bumper element for placing the decoder on an underlying surface, said bumper element having a protrusion on a side of the housing opposite to the side of the protective flap so that placing the decoder in a position in which the cable connection interface faces upwards will cause the decoder to tip over. The bumper element improves robustness of the decoder. The protrusion has the effect that it is impossible to place the decoder in a position in which the cable connection interface can be subject to rain. Error-proneness can be reduced and it can be assured that improper use or abnormal handling does not necessarily results in a defect.

In an embodiment the processing unit is configured to synchronize operation of a multiple RFID reader circuitries connected in a daisy chain via the reader interface. The term synchronize thereby refers to avoiding interference between immediately neighboring passive RFID readers. Neighboring readers may interfere with one another which can result in a lower detection rate of the passing sports timing transponders. By synchronizing (in particular time synchronizing) operation this can be avoided and the detection rate can be improved. A daisy chain particularly refers to a connection in series.

In an embodiment the decoder includes an active RFID reader processing circuit for determining passing times of active sports timing transponders. Additionally or alternatively, the decoder includes a heating unit for heating a battery in a battery compartment. The heating unit preferably includes an aluminum board. Additionally or alternatively, the decoder includes a communication unit for communicating via a mobile communication network having a first SIM module for receiving a first physical or virtual SIM card and a second SIM module for receiving a second physical or virtual SIM card. Preferably the first SIM module is accessible for the user and the second SIM module is not accessible for the user. The use of an active RFID reader processing circuit makes it possible to use the decoder with an induction loop connected thereto for the communication with and/or detection of active RFID sports timing transponders. A heating unit allows optimizing the battery lifetime and operation of the decoder in cold conditions (in particular charging batteries in cold environments). Making use of two different SIM modules allows a user to make use of his own mobile communication network albeit assuring that a connection is maintained also in case in which the user has not inserted the SIM card or has inserted the SIM card that has no connection. Consequently, the reliability is improved.

Herein, the term circuitry can refer to a hardware implementation by means of different individual electronic components, such as resistors, transistors, capacitors, inductors and dials. It is, however, also possible that the term circuitry refers to a function implemented in a microcontroller. This implementation can thereby be based on soft- and/or hardware. All combinations are possible, for instance, a portion of the circuitry being implemented in hardware and another portion being implemented in the form of software running on a microcontroller. In particular, it is possible that the calculation unit is implemented in the form of a microcontroller that also, at least partly, carries out further functions. An external force or an environmental impact can be a mechanical impact, for instance from a runner stepping onto the channel element or a vessel passing over the channel element. An external force or an environmental impact can also be a weather condition, such as rain, cold/hot temperatures, dust etc.

Herein, a sports timing transponder particularly refers to a passive RFID tag that has no integrated energy source but is activated to send out its identity by an RFID reader. However, in certain embodiments, a sports timing transponder may also correspond to an active RFID tag. A sports event is particularly a running event such as a marathon or the like. However, a sports event can also be a bike race, a car race, a ski race, a horse race, a swimming competition etc. An identity of a sports timing transponder can particularly be an alphanumeric number of the RFID tag. This alphanumeric identifier is programmed to the transponder upon manufacturing. The determination of a passing time may include activating and reading the identity of the sports timing transponder multiple times. The time of the strongest read could then, e.g., be considered to represent the passing time (passing time detection based on received signal strength). As used herein, the term decoder refers to a piece of hardware that is used at a sports event to determine passing times of passing sports timing transponders. A decoder does not necessarily decode any signal. In particular, a decoder does not necessarily include an RFID reader. The term center protection area does not mean that the corresponding area is necessarily arranged in the geometrical center. An offset is possible.

BRIEF DESCRIPTION OF THE DRAWINGS

These and other aspects of the invention will be apparent from and elucidated with reference to the embodiments described hereinafter. In the following drawings

DETAILED DESCRIPTION

Figure 1:
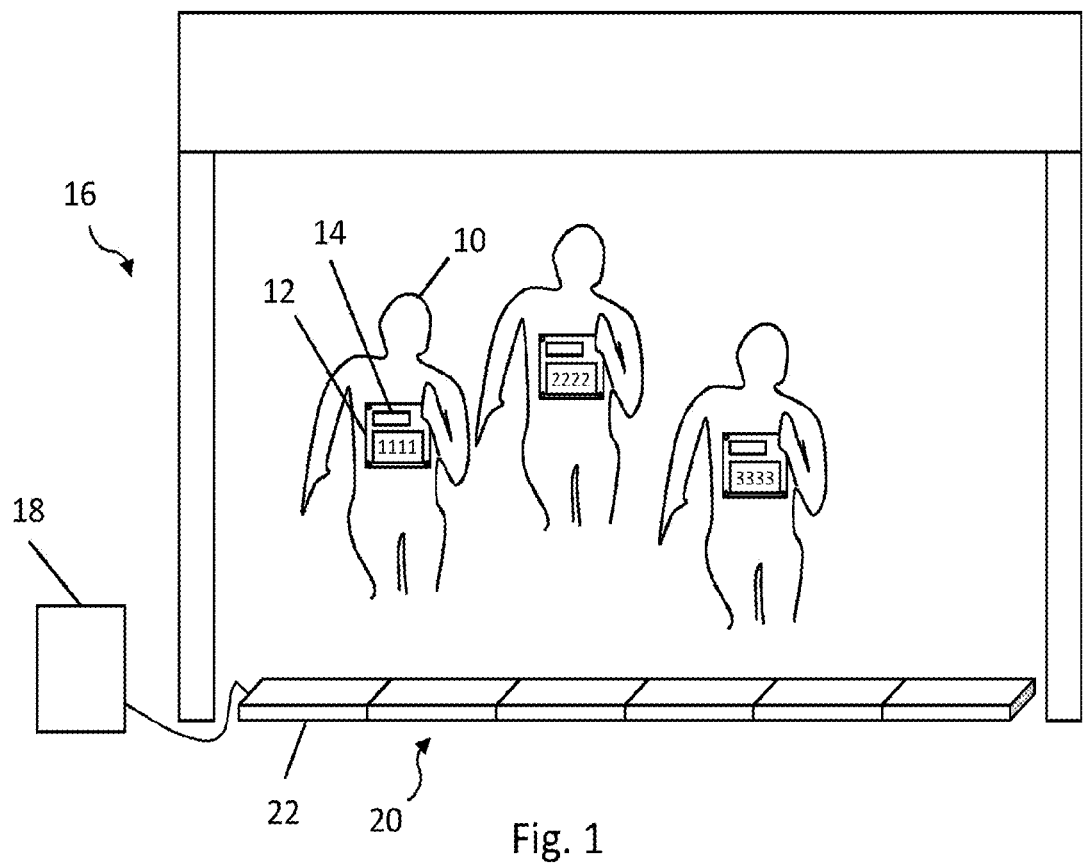
FIG. 1 shows a schematic illustration of participants of a sports event having a passing time measured by a race timing system according to an aspect of the present invention.

In FIG. 1 a plurality of participants participating in a sports event is schematically illustrated. The participants 10 may particularly be runners in a running event such as a marathon or the like. A participant 10 is identified by means of a bib number 12 corresponding to a participant ID. The bib number 12 can, e.g., be attached to the participant's shirt, to a handle bar of a bike or to a chassis of a race car. In the illustrated example, the bib number 12 has attached thereto a passive RFID sports timing transponder 14. This sports timing transponder 14 is used for carrying out a measurement of a passing time and for determining the identity via RFID when the participant 10 crosses the start or finish line or passes a split time measuring point.

In order to carry out the measurement of the passing time, the present invention proposes to make use of a race timing system 16 that includes a decoder 18 and a floor cable channel 20 that comprises multiple channel elements 22. In at least some of the channel elements 22 an antenna is arranged for reading out the passing sports timing transponders 14 in order to determine their passing times. Herein, a channel element 22 with an antenna and a calculation antenna arranged therein is referred to as a detection assembly.

FIGS. 2 to 7 show different views of an embodiment of a decoder 18 according to an aspect of the present invention. In FIGS. 2 to 7 but also in all other figures, corresponding reference numerals refer to the same components, respectively. However, not all reference numerals are inserted in all figures for the benefit of a clearer representation. For the same reason it is sometimes refrained from inserting the same reference numerals multiple times in a single figure to designate several similar components.

The decoder 18 in FIGS. 2 to 7 includes a reader interface 24, a cable connection interface 26, a user interface 28, a housing 30 and a processing unit that is arranged within the housing 30.

According to the invention, the user interface 28 is arranged on an outside of the housing 30. In the illustrated example, the user interface 28 includes a display 32 via which configuration feedback is provided to a user in addition to multiple buttons 34 that allow for the user to interact with the decoder 18 and, e.g., provide configuration information. Particularly, the user can obtain information on a status of the decoder 18 and the current readouts via the user interface 28. For instance, passing times of sports timing transponders or also IDs of passing sports timing transponders can be displayed.

In the illustrated exemplary embodiment, the user interface 28 is arranged on a top side of the housing 30 facing upwards when the decoder 18 is put on a ground surface. The user interface 28 is resistant to rain or splash water and/or resistant against further environmental impacts such as direct sunlight or mechanical stress etc., thereby allowing an operation in outdoor applications. Preferably, the display 32 can be implemented in the form of a monochrome LCD display that can be read out during daylight, if illuminated by the sun. It is possible that the display 32 is additionally equipped with a multicolor screen backlighting and can thus be illuminated in different colors. Via this additional information it becomes possible to efficiently inform a user of configuration parameters such as, for example, information about a timing position to which the decoder 18 is currently assigned.

The cable connection interface 26 particularly includes a network cable connector and/or a computer interface cable. In the illustrated example, the cable connection interface 26 includes three different network cable connectors 36 (network sockets), a regular USB connector 38 as well as a USB-C connector 40. The USB connector 38 and the USB-C connector 40 are configured for connecting a computer interface cable corresponding to a USB cable. The cable connection interface 26 may include further interfaces such as a power interface 41 for connecting a power cable and others.

Figure 5:
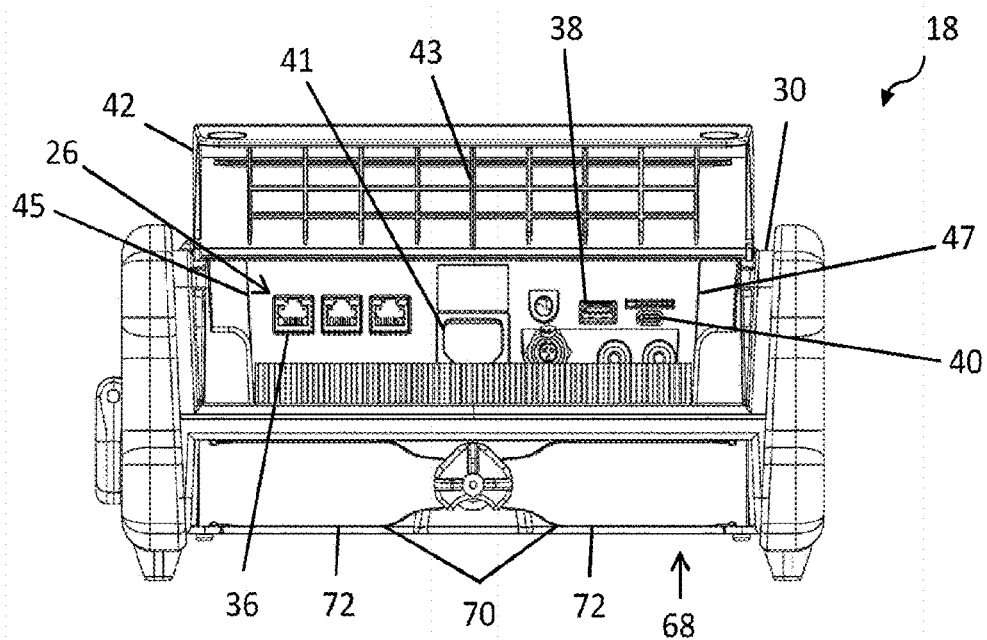
FIG. 5 shows a schematic illustration of a cable connection interface of the decoder arranged under the protective flap.

In order to protect the connectors from environmental impacts, in particular splash water, the cable connection interface 26 is arranged under a protective flap 42. Thereby FIGS. 2, 4, 6 and 7 illustrate a closed state of the protective flap 42 whereas FIGS. 3 and 5 illustrate an open state of the protective flap 42 in which the cable connection interface 26 can be accessed.

The protective flap 42 is preferably arranged to cover an upper portion of a front side of the housing 30. Thereby, the front side corresponds to a side of the housing 30 that is essentially oriented in a 900 angle to the top side of the housing and faces in the direction of the user when the user reads the display 32. As illustrated in FIGS. 3 and 5, the protective flap 42 can be opened to allow access to the cable connection interface 26. When the protective flap 42 is flapped open, cables can be connected and disconnected.

In the illustrated embodiment the protective flap 42 is hinged pivotably about a pivot axis 44 that is substantially parallel to the top side of the housing and the front side of the housing. As illustrated, the pivot axis 44 is positioned in a top side plane of the housing 30.

Figure 2:
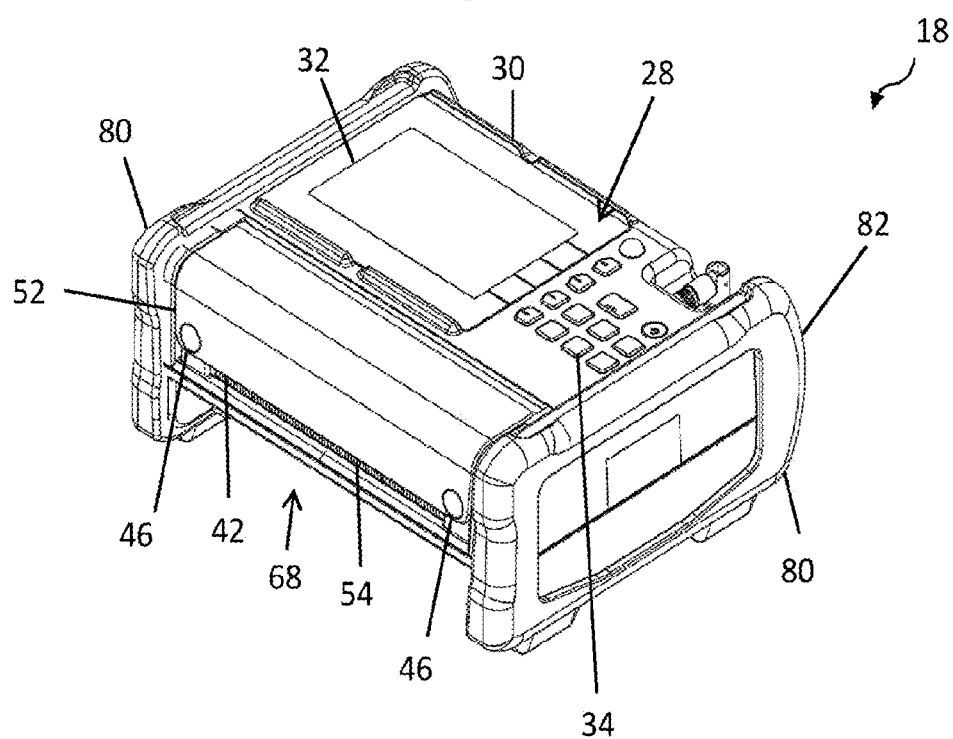
FIG. 2 shows a schematic perspective illustration of a decoder for a race timing system according to an aspect of the present invention with a protective flap in a closed state.
Figure 3:
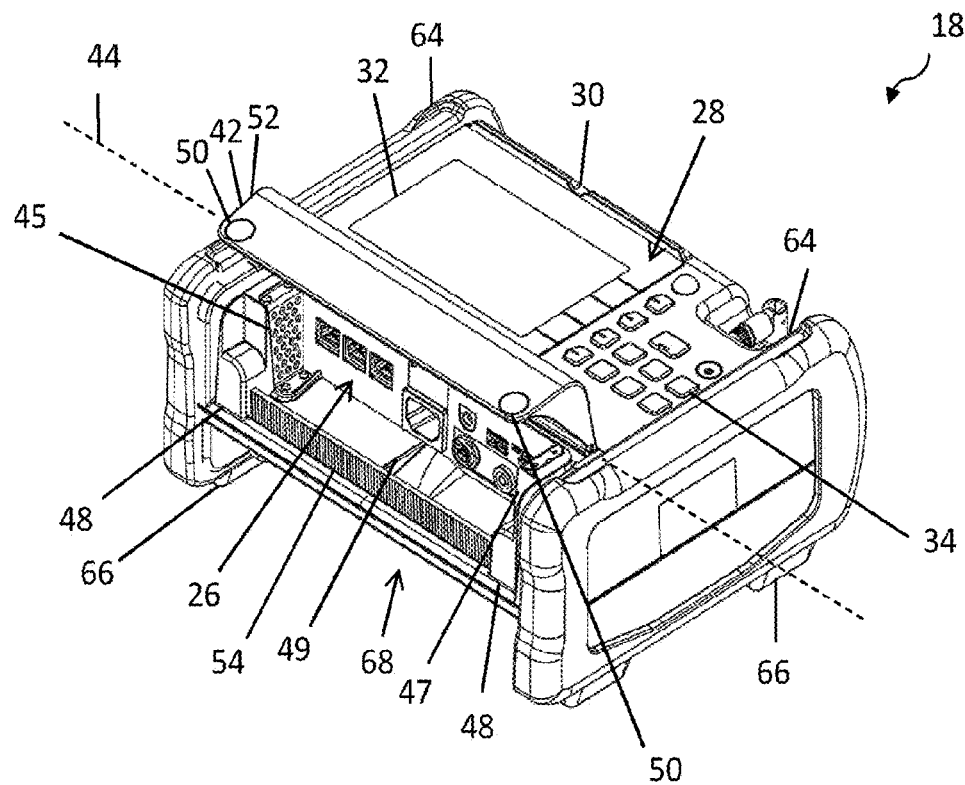
FIG. 3 shows a schematic perspective illustration of the decoder with the protective flap in an open state.
Figure 4:
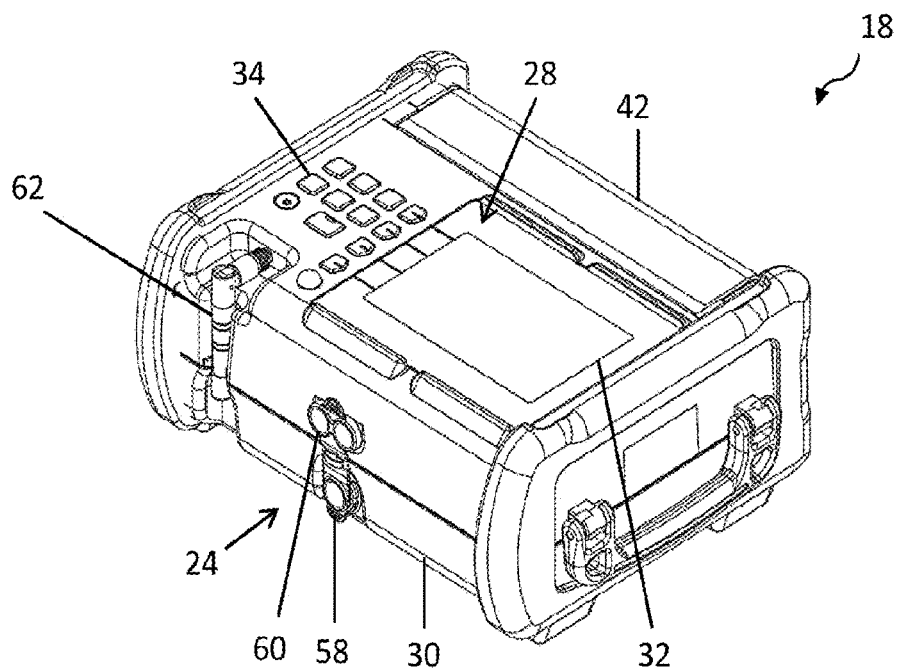
FIG. 4 shows a schematic perspective illustration of a reader interface of the decoder.

As it can be seen in FIGS. 2 and 3, the protective flap 42 may particularly have a curved shape that, in the illustrated embodiment, spans an angle of 90°. In order to lock the protective flap 42 in place, the illustrated embodiment of the decoder 18 includes a housing 30 having a locking mechanism 46. This locking mechanism 46 comprises at least one magnet 48 for magnetically holding the protective flap 42 in the closed state. In the illustrated embodiment, two magnets 48 are positioned in a portion of the housing 30 that is covered by the protective flap 42 in a closed state. The magnets 48 interact with corresponding counterparts 50, in particular magnets or metal plates that are integrated in the protective flap 42. When the protective flap 42 is closed, it is kept in place by the magnets 48 interacting with the counterparts 50. It is to be understood that the positions of the magnets and the counterparts can thereby also be switched.

In the illustrated embodiment, the protective flap 42 includes a lower portion 52 that, in a closed state, covers a section of the housing 30 below the cable connection interface 26. This makes it possible that rain or splash water that impacts the decoder 18 cannot reach the cable connection interface 26 and the connectors arranged therein in spite of capillary effects.

Further, in the illustrated embodiment, the housing 30 includes a brush extension 54 that reaches to the lower portion 52 of the protective flap 42 in the closed state. The brush extension 54 thereby corresponds particularly to a brush that allows cables to pass through the bristles but blocks splash water and water running along a cable from entering into the cable connection interface 26. The bristles of the brush extension 54 further improve the resilience against environmental impacts by providing an additional barrier.

In the illustrated embodiment, the reader interface 24 is arranged on a back side of the housing 30 and includes a passive RFID connector 58 as well as a loop antenna connector 60.

The passive RFID connector 58 connects to one or more RFID reader circuitries which again have an antenna connected. The passive RFID connector 58 is configured to receive detections of passive RFID sports timing transponders. In particular, the passive RFID connector 58 can be configured for connecting thereto a floor cable channel including multiple detection assemblies, each having an antenna and circuitry for detecting RFID tags.

The loop antenna connector 60 is configured to connect to an induction loop for communicating with active sports timing transponders. In particular, an electric field can be induced that can then be detected by active RFID sports timing transponders. The active RFID sports timing transponders can themselves calculate a passing time and transmit their passing time, for instance, via a wireless connection and a wireless communication antenna 62 of the decoder 18.

In the illustrated embodiment, the decoder 18 includes a top connection portion 64 that is arranged in the area of the top side of the housing 30 and a matching bottom connection portion 66 that is arranged in the area of a bottom side of the housing 30. The top connection portion 64 and the bottom connection portion 66 work together to provide for a stackability of multiple decoders 18. Thereby, it is possible that the top connection portion 64 provides two recesses on the top side of the housing 30 into which two or four protrusions on the bottom side of the housing 30 forming the bottom connection portion 66 can extend. The stackability thereby provides for a better storability of multiple decoders 18. Multiple decoders 18 can be stacked one over the next.

In the illustrated embodiment the housing 30 includes a recess 68 in the area of the bottom side of the housing 30 that provides a space for opening and closing the protective flap 42 of a below-stacked further decoder. Thus, if multiple decoders are stacked one over another, it is still possible to open their protective flaps 42 since, in the open state, the protective flap 42 can extend into the recess 68 of the above-stacked decoder 18. This results in an accessibility of the cable connection interface 26 of all decoders in a stack of decoders.

Figure 6:
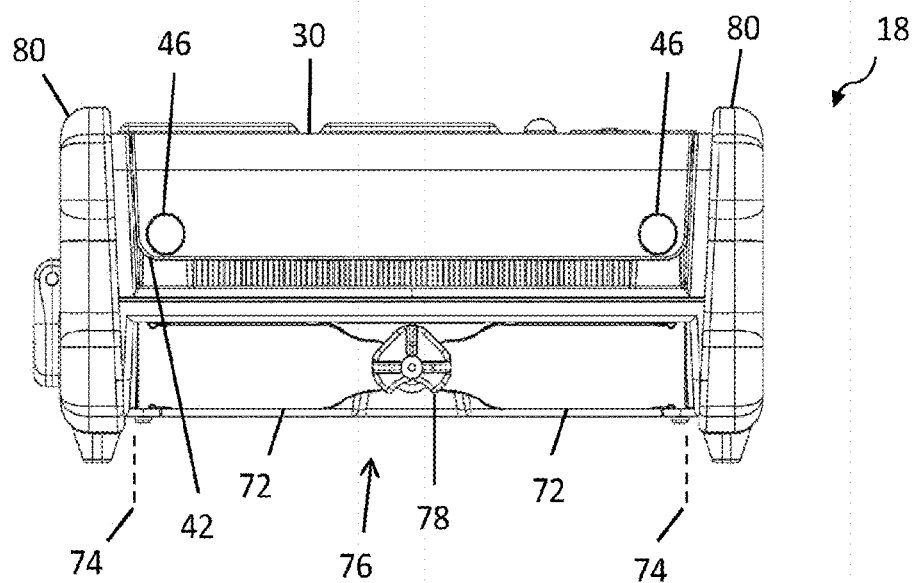
FIG. 6 shows a schematic illustration of a brush extension of the decoder.
Figure 7:
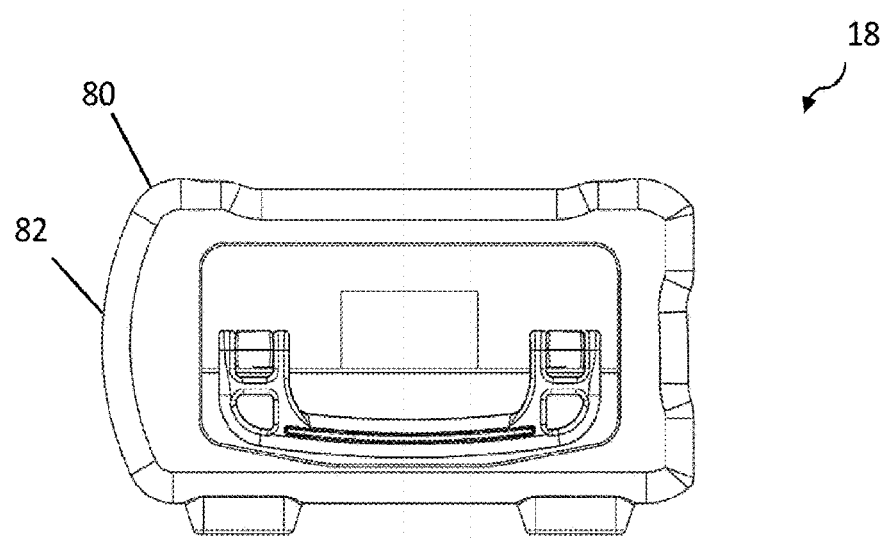
FIG. 7 shows a schematic side view illustration of the decoder.

Still further, the decoder 18 in the illustrated embodiment includes two battery compartments 70 that are configured to house two batteries. A battery fixation mechanism 76 makes it possible that batteries are housed and fixated in the battery compartments. For this, the battery fixation mechanism 76 includes two further protective flaps 72 and a closing element 78. The battery compartments can be closed by means of the two further protective flaps 72. The further protective flaps 72 can, e.g., pivot about two pivot axes 74, as illustrated in FIG. 6, to allow access to the batteries. The closing element 78 allows for fixating the two protective flaps 72 in a closed position.

Thereby, the closing element 78 is configured to simultaneously close both further protective flaps 72 in a first position and to selectively close only one of the further protective flaps 72 while opening the other of the further protective flaps 72 in a second and third position. In the illustrated embodiment, the closing element 78 is implemented in the form of a pivotable and irregularly shaped element that mechanically fixates both or one of the two further protective flaps 72. The pivot axis of the closing element 78 is thereby perpendicular to the illustrated plane of projection in FIGS. 5 and 6. Preferably, it is possible that the closing element 78 is held in one of the first, second and third position by means of a spring or another locking mechanism. The closing mechanism 78 makes it possible that one battery is replaced while the other battery remains fixated in the battery compartment 70. Thus, power supply can be maintained while changing one of the batteries. The two further protective flaps 72 are preferably transparent to allow a user to visually assess a presence and/or a charging state indication of a battery in a battery compartment 70. It is also possible that the charging state of the batteries assessed while the decoder itself is not operated and/or in a low-power mode. In combination with the stackability as described above, the transparency makes it possible that a presence and/or charging state of the batteries is assessed also while multiple decoders are stacked one over the other.

The decoder 18 may further include a bumper element 80. In the illustrated embodiment, the bumper element 80 comprises two rubber elements that embrace the housing 30 on a left and right side. The bumper element 80 thereby increases a resistance of the decoder 18 against mechanical stress during storage or during operation at a site of a sports event. As illustrated in the profile view in FIG. 7, the bumper element 80 thereby has a protrusion 82 on the back side of the housing 30 opposite to the side of the protective flap 42. In the illustrated embodiment this protrusion 82 is formed so that the decoder 18 tips over when being placed on the protrusion 82. The protrusion 82 corresponds to a rounded portion of the bumper element 80. In other words, the shape of the bumper element 80 is irregular so that the decoder cannot securely stand on the ground when the protrusion 82 faces downwards. This makes it impossible to place the decoder 18 in a position in which the protective flap 42 and the below-arranged cable connection interface 26 face upwards. Thus, even if a user tries to place the decoder 18 with the cable connection interface 26 facing upwards in the direction of pouring rain, this is not possible.

Figure 8:
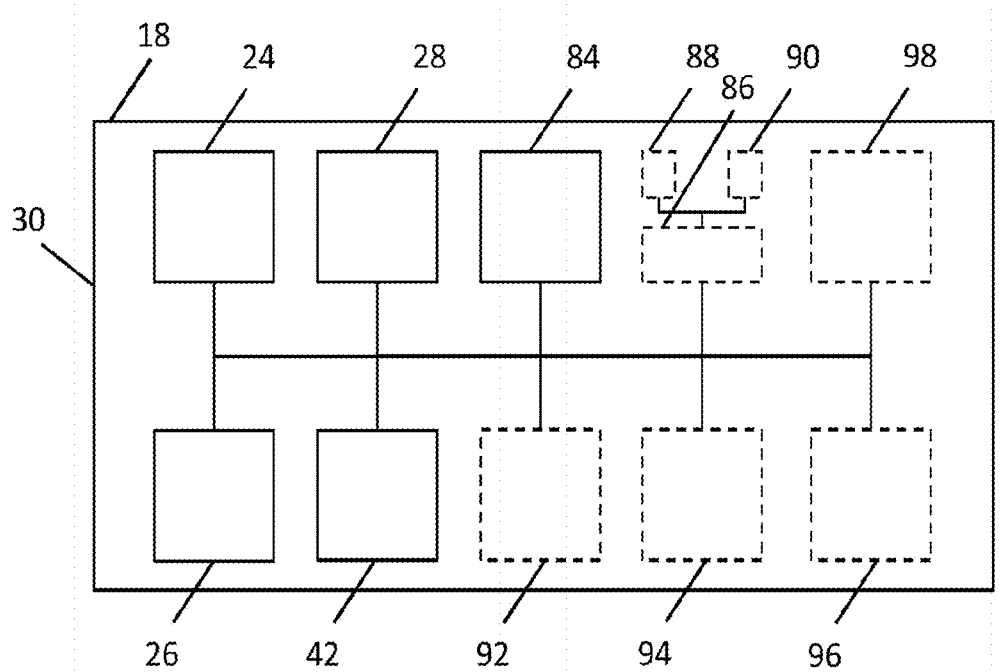
FIG. 8 shows a schematic illustration of different mandatory and optional components of the decoder.

FIG. 8 schematically illustrates the decoder 18 and its various components. Therein, dashed lines indicate optional components. The decoder 18 includes a reader interface 24, a cable connection interface 26, a user interface 28, a processing unit 84, a housing 30 and a protective flap 42.

Optionally, the decoder 18 includes a ventilation unit 86 for ventilating an inside of the housing 30 with outside air. In the illustrated embodiment, a ventilation outlet 45 and a ventilation inlet 47 are arranged under the protective flap 42 so that they are protected from environmental impacts, in particular splash water and rain. Air can enter and exit from the space under the protective flap 42 in the closed state through corresponding openings, e.g. underneath the lower portion 53 of the protective flap 42.

As further illustrated, it is possible that the protective flap 42 includes a barrier protrusion 43 that forms an airflow barrier between the ventilation outlet 45 and the ventilation inlet 47 under the protective flap in the closed state and blocks air from directly flowing between the inlet and the outlet. In the illustrated example the barrier protrusion 43 corresponds with a lower protrusion 49 arranged in the space under the protective flap 42 in the closed state. However, other mechanical implementations are possible in this respect.

Particularly, this barrier protrusion 43 can include an opening for a plug of a power cable. When a power cable is plugged in the opening is closed and the airflow between the inlet and the outlet is blocked while charging batteries or performing other power consuming operations that require ventilation.

It is possible that the ventilation unit 86 is thereby controlled based on a reading of a temperature sensor 88 and a humidity sensor 90 that are arranged within the housing 30. The ventilation strength of the ventilation unit 86 is thereby adjusted to prevent water condensation in the inside of the housing that might cause harm to the electronic components included in the housing 30. The combination of a temperature sensor 88 with a humidity sensor 90 has the advantage that water condensation in the housing can be prevented also in situations where it is cold outside.

Further optionally, the decoder 18 can include an RFID chip 92 for carrying information on the decoder 18. In particular, the RFID chip 92 is programmable via the processing unit 84. This makes it possible that even if the processing unit 84 is not operating or switched on (e.g. in order to save energy), information on the decoder 18 can be obtained by reading out the RFID chip 92 with a corresponding reader. For instance, if multiple decoders 18 are stored, an inventory control is facilitated. By programming the RFID chip 92 with the processing unit 84 it is possible to further write information on the RFID chip 92. For instance, the recharging state of a battery can be provided as further information to be read out. Energy can be saved since a readout is possible if the decoder 18 and processing unit 84 are not powered at all or run at a very low power consumption.

Further, it is possible that the decoder 18 includes an active RFID reader processing circuit 94 for determining passing time of active sports timing transponders. This active RFID reader processing circuit 94 can particularly interact with an induction loop connected to the loop antenna connector. The active RFID sports timing transponders may wirelessly transmit information to a wireless communication antenna of the decoder.

Still further, the decoder 18 may include a heating unit 96 for heating at least one battery in one of the battery compartments. This heating unit may particularly include an aluminum board that is arranged close to the batteries (in particular over the batteries) in the battery compartments. By heating the batteries or warming the batteries it becomes possible to operate the decoder 18 also in cold environments (in particular to enable charging the batteries in cold environments) and increase runtime and lifetime of the batteries.

Still further, the decoder 18 may include a communication unit 98 for communicating via a mobile communication network. In particular, it is advantageous if the communication unit 98 has a first SIM module for receiving a first physical or virtual SIM card and a second SIM module for receiving a second physical or virtual SIM card. By making use of two SIM cards, it becomes possible that one SIM card is accessed by the user whereas the other SIM card is arranged internally and cannot be accessed by the user. Thus, it is possible that a user inserts his own SIM card and communicates via his wireless network of choice, whereas another SIM card is provided by a service provider and assures that the service provider can access the decoder 18 for providing software updates etc. independently of the user's own SIM card and mobile network connection.

The processing unit 84 is configured to control the different components. Furthermore, the processing unit 84 may process data received via the reader interface 24 and communicate the processed data to the internet. The processing unit 84 may also control components, in particular detection assemblies connected via the reader interface 24, e.g. by providing a synchronization signal or configuration parameters. The processing unit 84 may particularly be implemented in the form of a microcontroller or system-on-chip (SoC) running a corresponding software.

Figure 9:
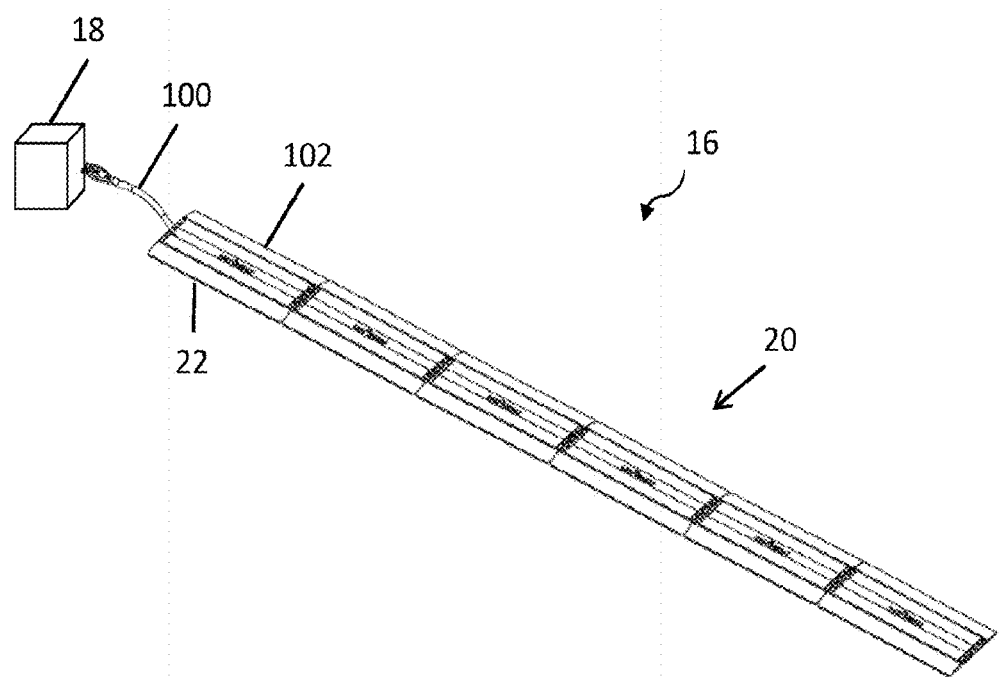
FIG. 9 shows a schematic illustration of a floor cable channel according to an aspect of the present invention.

FIG. 9 shows a schematic illustration of the race timing system 16 according to an aspect of the present invention. The race timing system 16 includes a decoder 18 in addition to a floor cable channel 20 having six channel elements 22, each including an antenna and a calculation unit to form a detection assembly 102. The cable channel 20 is connected to the decoder 18 via a cable 100 connecting a calculation unit in a detection assembly 102 to the reader interface of the decoder 18.

The floor cable channel 20 includes multiple detection assemblies 102, each comprising an antenna and a calculation unit housed in a channel element 22. The channel element 22 thereby corresponds to a mechanical protection of the antenna and the calculation unit connected to the antenna to protect the antenna and calculation unit from external forces such as vessels passing over the floor cable channel 20, weather conditions like snow or rain, or participants of a running event etc. The multiple detection assemblies 102 thereby form a line. The number of detection assemblies 102 in a line or in a floor cable channel 20 is thereby flexible. For instance, six detection assemblies 102 can be connected.

Figure 10:
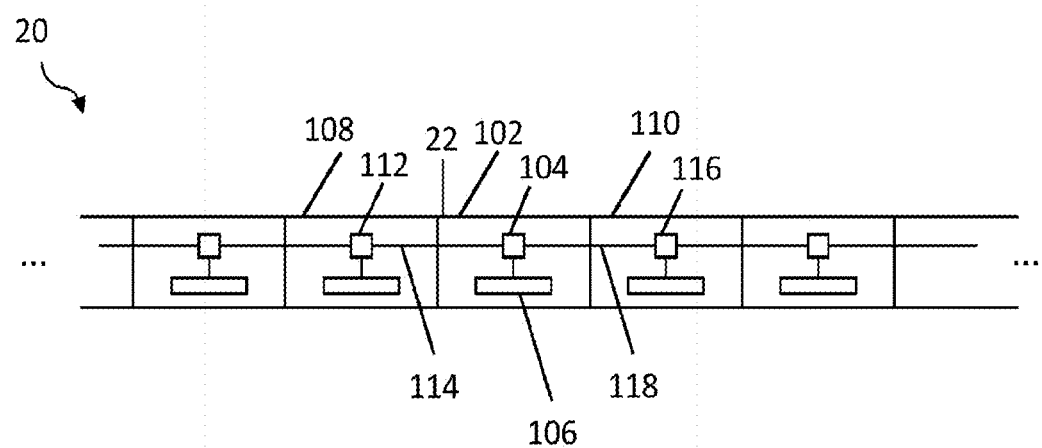
FIG. 10 shows a schematic illustration of multiple detection assemblies being connected in a daisy chain.
Figure 11:
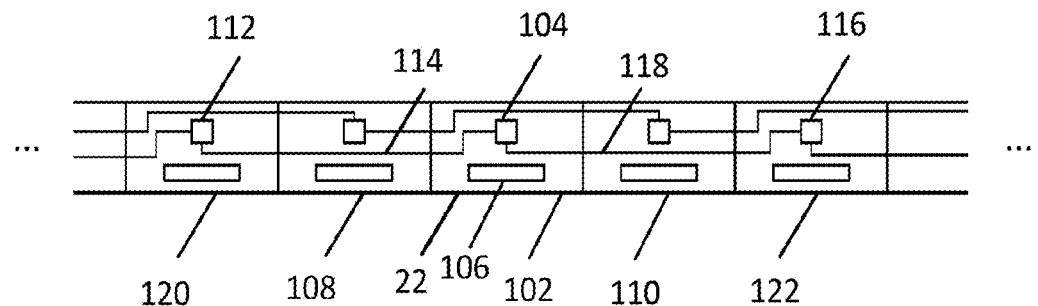
FIG. 11 shows a schematic illustration of an alternative connection of the multiple detection assemblies in a daisy chain.

FIGS. 10 and 11 illustrate different options for the wiring of the multiple detection assemblies 102 of a floor cable channel 20. Each detection assembly 102 includes a channel element 22, a calculation unit 104 and an antenna 106. Each channel element 22 is connected to a preceding channel element 108 and a following channel element 110. It is to be understood that the following and the foregoing description is thereby outlined from the point of view of the detection assembly 102 in the middle of the illustrated floor cable channel 20 but that the concept is applicable to all the different detection assemblies 102.

As illustrated in FIG. 10, the calculation unit 104 can be connected to a first neighboring calculation unit 112 via a first cable 114 and to a second neighboring calculation unit 116 via a second cable 118. Thereby, the first cable 114 extends into the preceding channel element 108 and the second cable 118 extends into the following channel element 110.

FIG. 11 shows an alternative configuration. The calculation unit 104 is connected via the first cable 114 to a first neighboring calculation unit 112 located in a pre-preceding channel element 120. Thereby, the pre-preceding channel element 120 corresponds to the channel element preceding the preceding channel element 108. Similarly, the calculation unit 104 is connected to a second neighboring calculation unit 116 located in a post-following channel element 122. In other words, every second calculation unit 104 in the floor cable channel 20 is connected so that essentially two chains of communication are formed. The cables are bypassed through the preceding channel element and the following channel element, respectively. By making use of two chains of communication it becomes possible to improve resilience against mechanical defects. For instance, if one line of communication is damaged, there still exists another line of communication so that at least part of the detections can still be made. For better legibility, FIG. 11 does not show the connection between each calculation unit 104 and antenna 106 in the channel elements.

Figure 12:
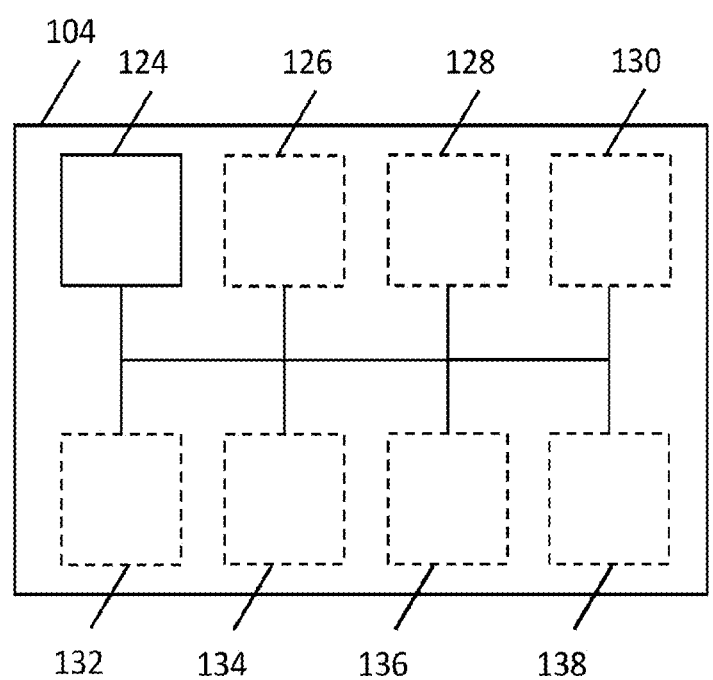
FIG. 12 shows a schematic illustration of the different components of a calculation unit in a detection assembly of the present invention.

FIG. 12 schematically illustrates a calculation unit 104 of a detection assembly. The calculation unit 104 includes a voltage detection circuitry 124. Optionally, the calculation unit 104 includes a data bus circuitry 126, a terminal detection circuitry 128, a position detection circuitry 130, a reconfiguration circuitry 132, a communication circuitry 134, a defect detection circuitry 136 and an RFID reader circuitry 138. Thereby, the different components (circuitries) can be partly or completely implemented in soft- and/or hardware. It is possible that one component fulfills the functionalities of multiple of the circuitries. In particular, the calculation unit 104 can correspond to a microcontroller having multiple peripheral and other electronic components connected thereto. The calculation unit can also be referred to as a reader unit or as an RFID reader.

The voltage detection circuitry 124 is configured to detect whether power is provided to the calculation unit 104 via the first cable or via the second cable. In particular, this makes it possible to determine via which of the two cables the calculation unit 104 is connected to a decoder providing the power supply and receiving the determined information from the passing sports timing transponders. It is thereby possible that the voltage detection circuitry 124 includes a metal oxide semi-conductor field-affect transistor that enables a through-switching of electrical power from one calculation unit to the next in the chain. Alternatively, it is possible that a bipolar junction transistor (BJT), a relay or another switch is used. Upon start-up of the detection assembly, i.e. upon initial power connection, the voltage detection circuitry 124 determines from which side power is provided. Then, a through-connection is initialized so that power is connected through to the respective neighboring calculation unit. During operation and in case power is lost (new set-up, reconnection, reconfiguration etc.) a corresponding memory portion is deleted and it is detected from which of the first cable and second cable power is provided anew.

The data bus circuitry 126 may provide a data bus communication with further calculation units of further detection assemblies connected via the first cable and the second cable in a daisy chain. A data bus communication thereby refers particularly to serial bus communication that provides a communication with or without a host device. In particular, it is possible that the data bus circuitry 126 provides a CAN bus communication. Alternatively, another bus system can be used, in particular a differential bus system such as RS-485. Also, Powernet can be used. The different calculation units connected to one another in a chain may communicate with a processing unit positioned in a decoder connected to the floor cable channel. A serial communication is established.

The terminal detection circuitry 128 allows detecting whether the calculation unit 104 is connected to only one of the first neighboring calculation unit and the second neighboring calculation unit. For instance, a resistor may be switched to terminate the data bus if no further calculation unit is connected. Upon initial start-up the default operation is preferably that each of the calculation units in the chain terminates the data bus communication. If power is connected to the first calculation unit in the chain, it is checked whether a neighboring calculation unit acts on one of the data pins of the bus communication. Only if this is the case, the data bus is connected through to the respective neighboring calculation unit. This allows for assuring that the data bus communication can be established. In order to detect defects in the data bus communication, a time-out functionality can be implemented. If a predetermined time passes after no data bus communication is possible, then the terminal detection circuitry 128 again terminates the data bus communication and only reestablishes the communication upon determining that the respective neighboring calculation unit acts on one of the data pins. This makes a reconfiguration during runtime possible.

The position detection circuitry 130 makes it possible to detect a number of calculation units connected via the first cable and/or a number of calculation units connected via the second cable. Thereby, the position detection circuitry 130 can announce its presence on the data bus upon start-up. In a centralized communication scheme with a central host or master, it can then be attributed a number corresponding to its position in the chain from this master. Alternatively, it is also possible that upon receipt of the start-up message from the new calculation unit in the chain, all other calculation units that are already present in the chain provide a reply message on the data bus so that the position detection circuitry can assess a number of calculation units already present and can attribute a next higher number to itself corresponding to its position in the chain. Other possible solutions include that only the other calculation unit with the currently highest ID replies.

The reconfiguration circuitry 132 allows for detecting a change in a number of calculation units connected via the first cable and/or a change in a number of calculation units connected via the second cable. This again allows for detecting a defect of one of the calculation units in the chain during runtime or a reconfiguration of the floor cable channel during runtime.

The communication circuitry 134 may particularly be suitable for communicating with a decoder and a processing unit of this decoder that is connected via the first cable or via the second cable. The communication circuitry 134 can thereby provide for a data bus communication, preferably a CAN-bus communication. It is possible that the communication circuitry 134 is configured to receive from the decoder a synchronization signal for synchronizing operation of the calculation units in the line of detection assemblies or in the chain of calculation units, respectively. Further, it is possible that a position information is received from the decoder indicating a position of the calculation unit in a chain of calculation units from the point of view of the decoder. This position information may form the basis for an efficient bus communication.

The defect detection circuitry 136 provides for detecting defects in the calculation unit. In particular, the defect detection circuitry 136 may be implemented in the form of a separate integrated circuit. This makes it possible that even if a central microcontroller of the calculation unit 104 is defect, it is still possible to connect the two neighboring calculation units with one another. Thereby, this connection particularly includes a data communication and a power connection. This defect detection circuitry 136 makes it possible that an additional safety against hardware failures is obtained. As soon as a defect is detected, the respective calculation unit is skipped so that at least part of the functionality of the cable channel can be maintained.

The RFID reader circuitry 138 may particularly correspond to the circuitry necessary for detecting a passing RFID transponder. In particular, the calculation unit may thereby correspond to an RFID reader. The signals obtained via the antenna are evaluated to determine whether a passive RFID-tag corresponding to the sports timing transponder has passed. If one passing passive RFID-tag is detected, a corresponding passing time is determined. In particular, it is still thereby possible that a received signal strength (RSS) is evaluated. Alternatively/additionally, however, it is possible that a phase change of a signal is evaluated.

Figure 13:
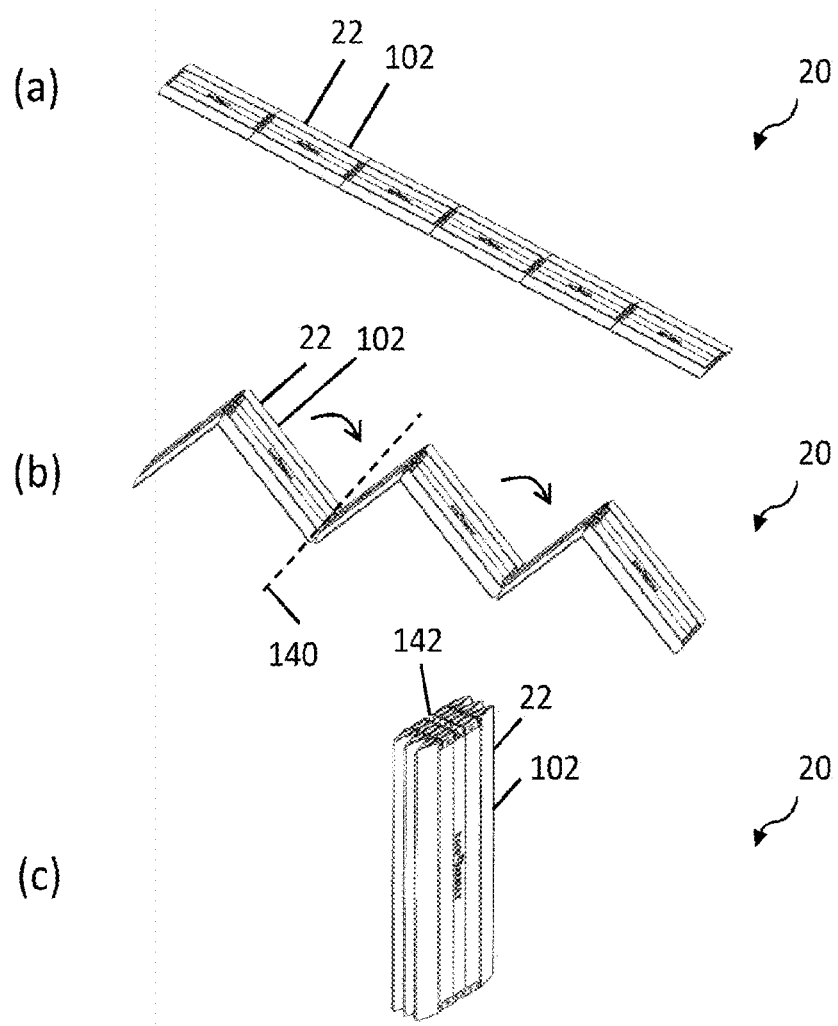
FIG. 13 shows a schematic illustration of a floor cable channel of the present invention being brought from an operating position (a) via an intermediate position (b) into a transport position (c)

In FIG. 13 an embodiment of a floor cable channel 20 of the present invention is schematically illustrated. The illustrated floor cable channel 20 includes six detection assemblies 102 that are connected to one another to form a line. In FIG. 13 (*a*) the floor cable channel 20 is in an operating position in which the different channel elements 22 are arranged one behind the other along their longitudinal axis. FIG. 13 (*b*) schematically illustrates that by means of a rotational movement of the neighboring channel elements 22 versus one another in the direction of the illustrated arrows the floor cable channel 20 can be brought into a transport position, as illustrated in FIG. 13 (c). One of the rotational axes 140 is schematically illustrated in FIG. 13 (b). In the transport position illustrated in FIG. 13 (c) the channel elements 22 of the floor cable channel 20 are arranged parallel to each other.

By bringing the floor cable channel 20 from the transport position into the operating position an easy set-up of the race timing system of the present invention becomes possible. For instance, if multiple floor cable channels 20 have to be installed on site at a sports event, the set-up is facilitated by making it possible that the different floor cable channels 20 are transported to their respective positions in the transport position and deployed by means of the illustrated rotational movement.

In order to provide this rotation functionality, the different channel elements 22 of the floor cable channel 20 are connected to their neighboring channel elements by means of connection elements 142. These connection elements 142 can be joint-like. For instance, a hook or double hook representing a connection element 142 can be clamped into corresponding receptacles in neighboring channel elements 22.

Figure 14:
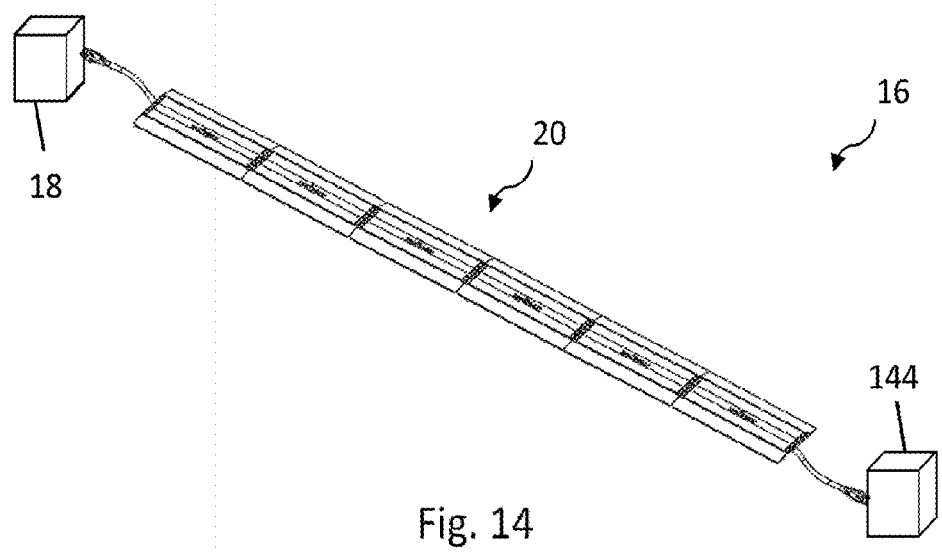
FIG. 14 shows a schematic illustration of a race timing system including two decoders connected to two sides of a floor cable channel.

In FIG. 14 another embodiment of a race timing system 16 of the present invention is schematically illustrated. The race timing system 16 includes a floor cable channel 20 that is connected to a decoder 18 and a further decoder 144. The two decoders 18, 144 are arranged on two different sides of the floor cable channel 20. On the one hand, such a set-up can provide for redundancy if one of the two decoders 18, 144 fails. On the other hand, it is also possible that two separate chains of calculation units as illustrated in FIG. 11 are independently connected to separate decoders 18, 144.

Figure 15:
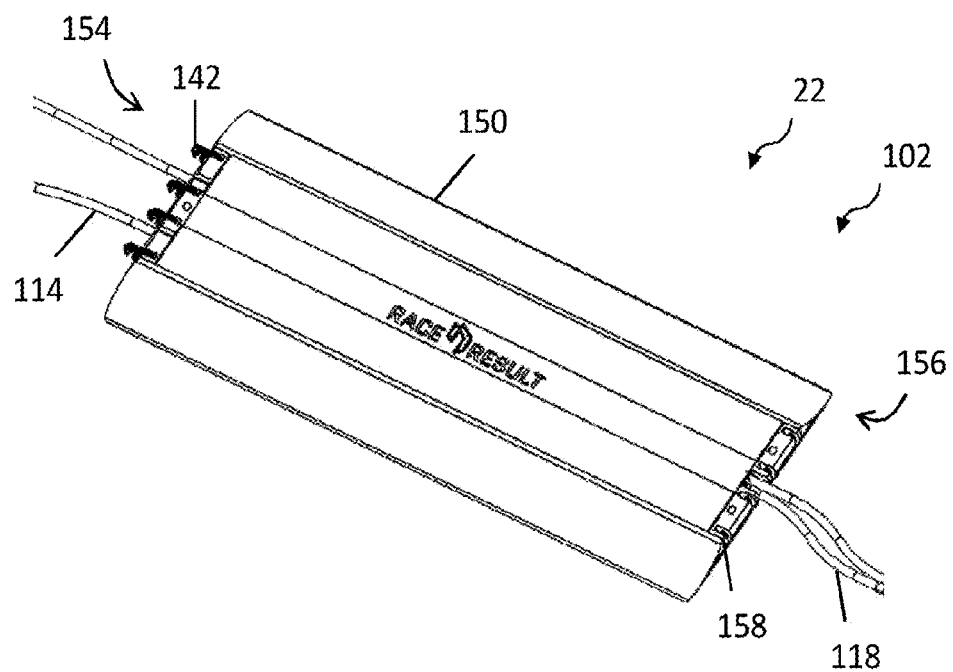
FIG. 15 shows a schematic illustration of a detection assembly according to an aspect of the present invention.
Figure 16:
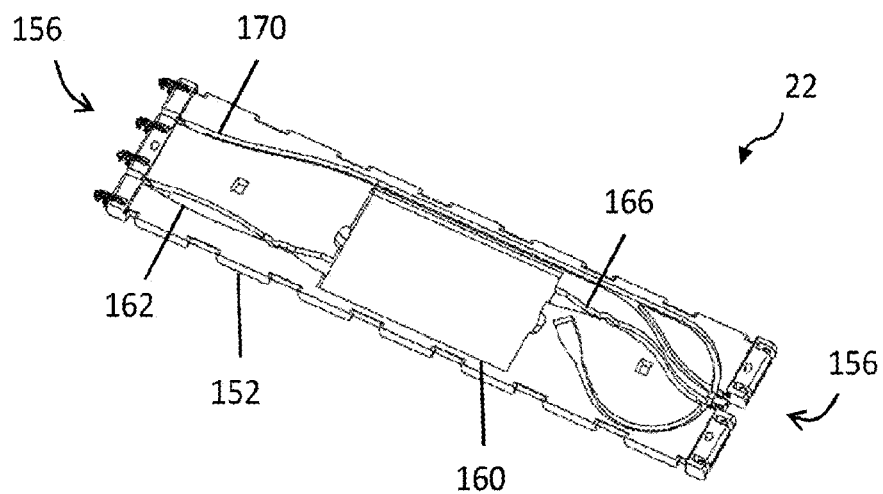
FIG. 16 shows a schematic illustration of a channel element according to an aspect of the present invention.
Figure 17:
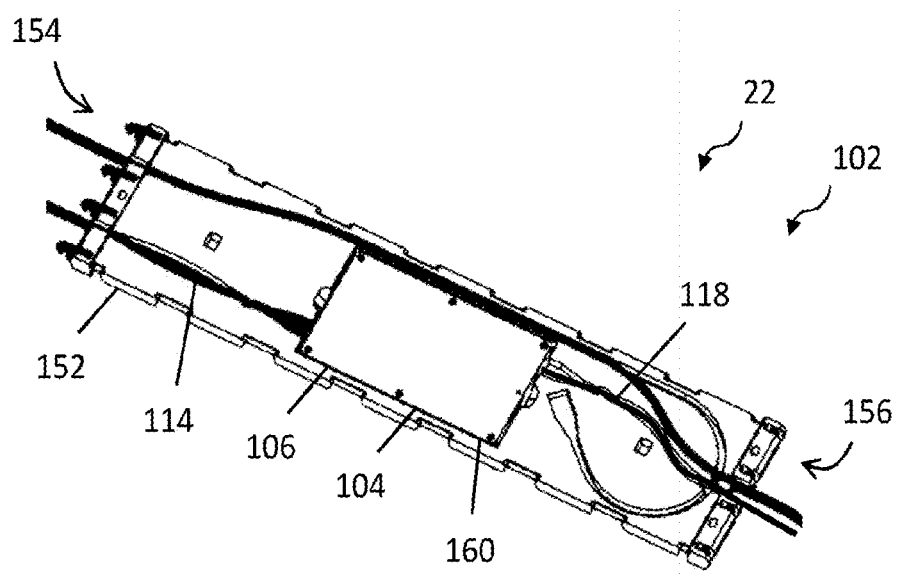
FIG. 17 shows a schematic illustration of a channel element including an antenna as well as a first cable, a second cable and a cable in a bypass protection area.

In FIGS. 15 to 17 an embodiment of a detection assembly 102 including a channel element 22, an antenna 106 and a calculation unit 104 is illustrated. The channel element 22 includes a top portion 150 and a bottom portion 152 connectable to the top portion 150. FIG. 15 illustrates the detection assembly 102 with the top portion 150 covering the bottom portion 152 in which the antenna 106 and the calculation unit 104 are housed. FIG. 16 shows the bottom portion 152 of the channel element 22 without the antenna 106, the calculation unit 104 and the connecting cables. FIG. 17 shows the bottom portion 152 with the antenna 106, the calculation unit 104 and the corresponding cables therein. The connection between the top portion 150 and the bottom portion 152 can be implemented in the form of a snapping or clicking mechanism.

The antenna 106 and the calculation unit 104 may be arranged on two printed circuit boards being stacked with a spacer layer between. Thereby, the spacer layer can particularly be implemented in the form of a polystyrene layer. The antenna 106 can particularly be implemented in the form of a patch antenna. By making use of the polystyrene layer in between the calculation unit 104 and the antenna 106 it becomes possible to obtain a suitable directional characteristic of the antenna 106 in the desired direction (in particular upward when the detection assembly is placed on the ground in order to detect sports timing transponders of participants in a sports event).

Referring to FIGS. 15 to 17 the channel element 22 includes a first connection portion 154 for connecting the channel element 22 to a preceding channel element and a second connection portion 156 for connecting the channel element 22 to a following channel element. As illustrated and as also explained above, the connection can thereby, e.g., be implemented in the form of one or multiple connection elements 142 that are designed to clamp to corresponding protrusions 158.

The channel element 22 includes a center protection area 160 in which the antenna 106 is received. Further, the channel element 22 includes a first protection area 162 for receiving a first cable 114 and a second protection area 166 for receiving a second cable 118. Thereby, the first protection area 162 connects the center protection area 160 to the first connection portion 154, i.e. the connection portion connecting the channel element to a preceding channel element. Thus, a cable can be guided from the center protection area 160 to the first connection portion 154. The second protection area 166 connects the center protection area 160 to the second connection portion 156. In addition, the channel element 22 includes a bypass protection area 170 that connects the first connection portion 154 to the second connection portion 156. In this respect the term connect means that respective protection area is designed to house and protect a respective connection cable.

In the illustrated embodiment, the center protection area 160, the first protection area 162 and the second protection area 166 correspond to cavities formed between the top portion 150 and the bottom portion 152. In particular, the cavities are formed out in the bottom portion 152 and are covered by flat segments of the top portion 150.

The channel element 22 of the present invention thereby makes it possible that in a line of multiple channel elements that are connected at their respective connection portions, the calculation units in every second channel element are connected to one another (for data and power transfer). Thus, the second cable 118 of one detection assembly connects the calculation unit of this detection assembly to a calculation unit in a channel element that follows the following channel element. The second cable 118 is thereby guided through the bypass protection area 170 of the following channel element.

Figure 18:
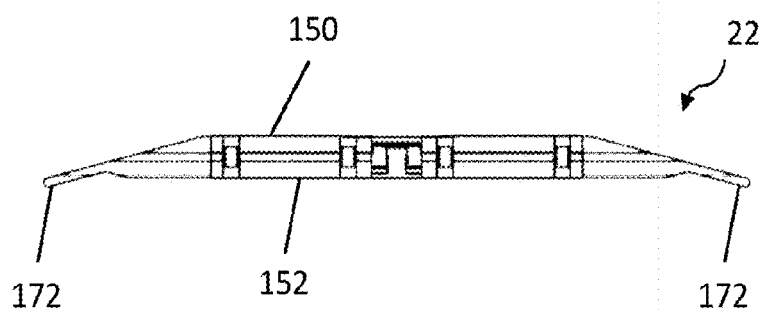
FIG. 18 shows a schematic illustration of a sectional view of a channel element.

FIG. 18 schematically illustrates a sectional view of a channel element of the present invention. As illustrated, the top portion 150 overlaps the bottom portion 152 in a direction orthogonal to a longitudinal axis of the channel element (right-left-direction in FIG. 18). In the illustrated embodiment, the overlap thereby corresponds to flexible protrusion portions 172 on both sides of the top portion 150. These flexible protrusion portions 172 are designed to accommodate unevenness of the underlying surface. The flexible protrusion portions 172 thereby extend along the longitudinal axis of the channel element so that over the entire length of the channel element the top portion can provide for a direct contact of the channel element 22 with the underlying surface.

Figure 19:
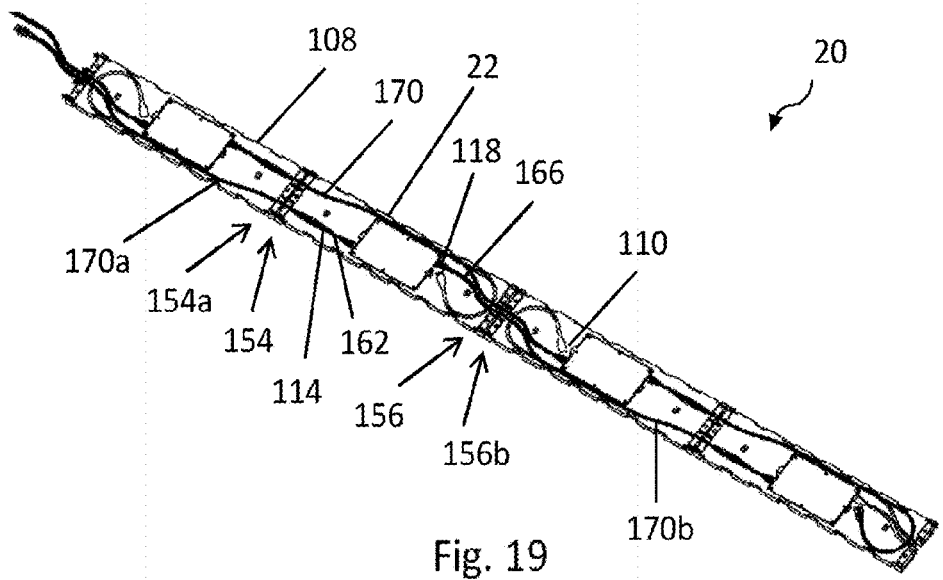
FIG. 19 shows a schematic illustration of four channel elements.

In FIG. 19 an embodiment of a floor cable channel 20 comprising four detection assemblies and four channel elements is illustrated. The following description and explanation is to be understood from the perspective of the second channel element 22 or detection assembly 102 from the left side but can be transferred to others in the line and to longer/shorter floor cable channels.

The channel element 22 is connected at its first connection portion 154 to a preceding channel element 108 and, at its second connection portion 156, to a following channel element 110. In the illustrated embodiment, the preceding first connection portion 154a of the preceding channel element 108 is connected to the first connection portion 154 of the channel element 22. The following second connection portion 156b is connected to the second connection portion 156 of the channel element 22. The first cable 114 runs from the first protection area 162 to the preceding bypass protection area 170a of the preceding channel element 108. The second cable 118 in the second protection area 166 is guided to the following bypass protection area 170b in the following channel element 110. Consequently and as explained above, the calculation units in every second detection assembly are connected. In the illustrated example, the calculation unit in the preceding channel element 108 is connected to the calculation unit in the following channel element 110 by means of a cable running through the bypass protection area 170 of the channel element 22.

As illustrated in FIG. 19, the cable outlets of the first protection area 162 and the bypass protection area 170 at the first connection portion 154 are (optionally) arranged at a different distance from one another than the cable outlets of the second protection area 166 and the bypass protection area 170 at the second connection portion 156. Thereby, the first connection portion 154 can only be connected to a preceding first connection portion 154a of the preceding channel element 108. This construction makes it possible to avoid a crossing of the cables, which again results in an additional increase in robustness.

Figure 20:
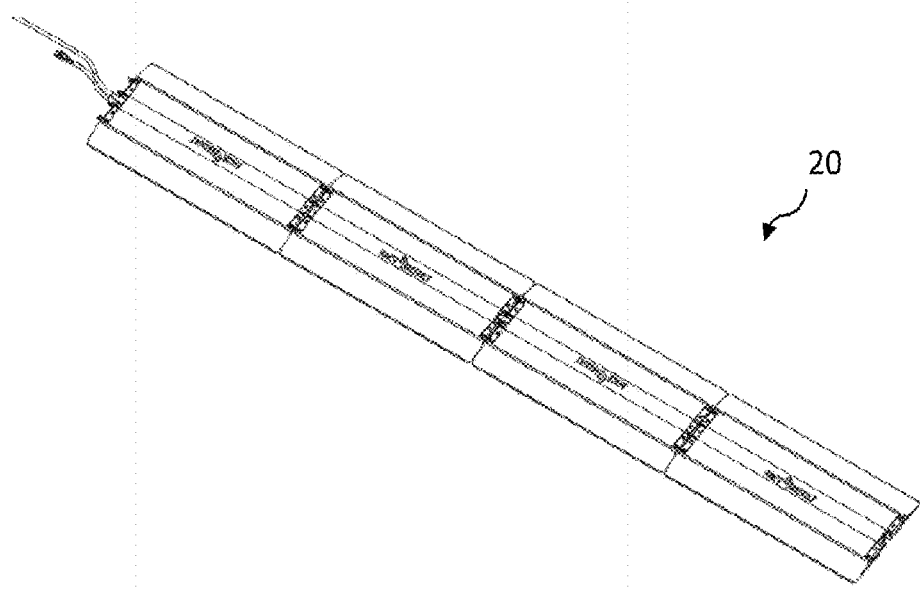
FIG. 20 shows a schematic illustration of four detection assemblies.
Figure 21:
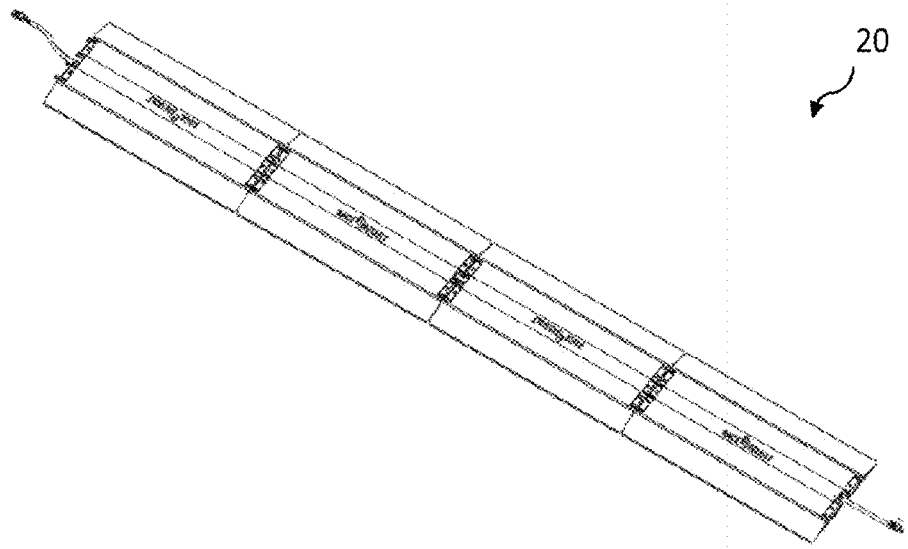
FIG. 21 shows a schematic illustration of another embodiment of a floor cable channel including four detection assemblies.

As illustrated in FIGS. 20 and 21, it is thereby possible that either both chains of calculation units are connected on one side of the cable channel (left side in FIG. 20) or that the different chains are connected on two sides of the floor cable channel 20 (FIG. 21).

Figure 22:
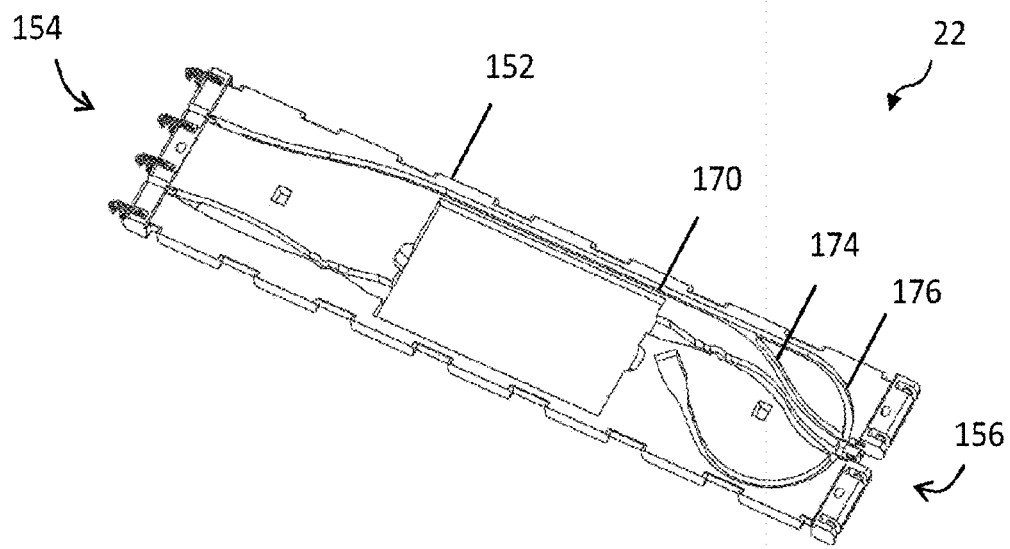
FIG. 22 shows a schematic illustration of a channel element.

In FIG. 22 the bottom portion 152 of a channel element 22 is schematically illustrated. In the example, the bypass protection area 170 is designed to include a relay portion 174 in addition to a terminal portion 176. Thereby, the relay portion 174 is designed to connect the first connection portion 154 to the second connection portion 156, i.e. to guide a cable through the entire channel element 22 between two corresponding cable outlets. On the other hand, the terminal portion 176 is designed to store an end section of a cable in the bypass protection area 170. A cable in the bypass protection area can alternatively be placed in the terminal portion 176 or in the relay portion 174. Thus, an overlap of the cable can be prevented in case the channel element 22 represents the last channel element in a floor cable channel. In the bypass protection area 170 a cable originating from a preceding channel element can be housed and protected from environmental impacts. In order to prevent an overlap of this cable out of the channel element 22, the cable can be stored in the terminal portion 176 (by a user) if no further channel elements are to be connected.

Figure 23:
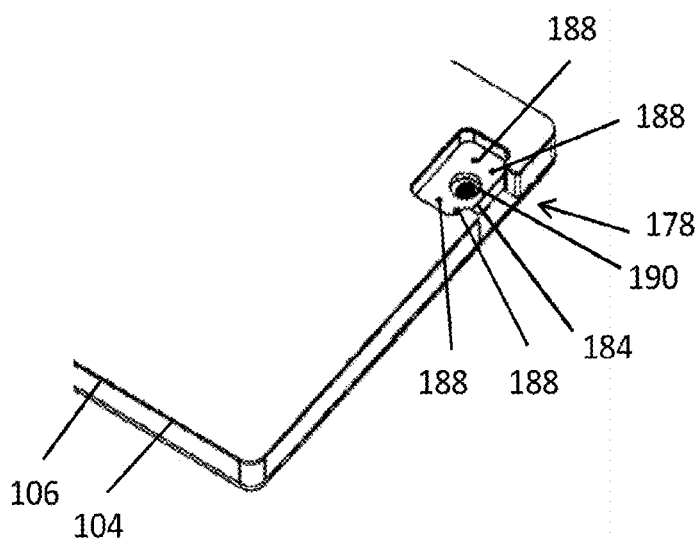
FIG. 23 shows a schematic illustration of an assembly of a calculation unit and an antenna including a first connector part for connecting to a cable.
Figure 24:
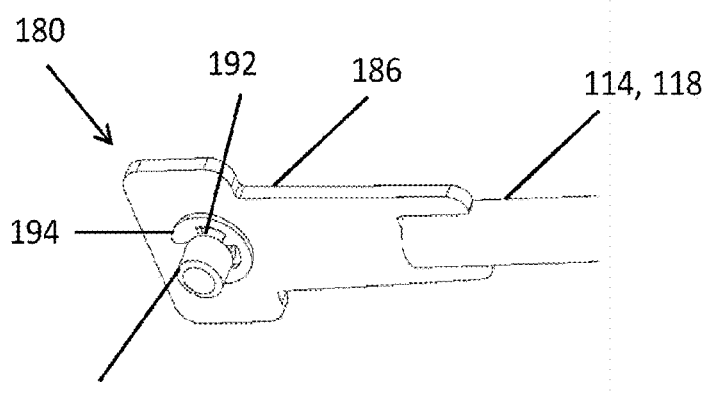
FIG. 24 shows a schematic illustration of a second connector part located at a cable.
Figure 25:
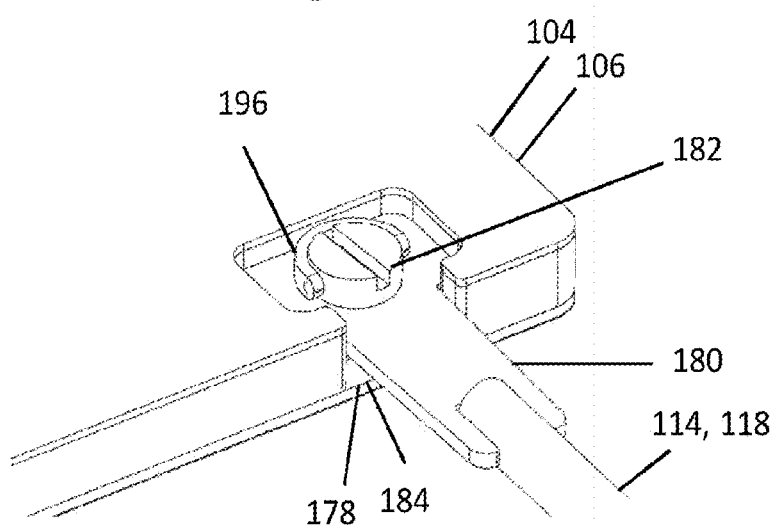
FIG. 25 shows a schematic illustration of first connector part being in connection with a second connector part to establish an electric connection.

In FIGS. 23, 24 and 25 a preferred embodiment of a connection between a cable 114, 118 (first cable or second cable, respectively) and a calculation unit 104 is schematically illustrated. The calculation unit 104 is connectable to the first cable 114 and/or the second cable 118 by means of a first connector part 178 and a second connector part 180 that are designed for being screwed together by means of a screw 182 to establish an electric connection (and a robust mechanical connection). In the illustrated embodiment, the electric connection has four conductors. It is, however, also possible to use different number of conductors. FIG. 23 particularly shows the first connector part 178, FIG. 24 particularly shows the second connector part 180 and FIG. 25 particularly shows the two connector parts 178, 180 being screwed together by means of the screw 182.

In comparison to previous approaches relying on plug-and-socket connections the use of the screw 182 for connecting the first connector part 178 and the second connector part 180 allows for a robust connection that provides mechanical stability in a comparably small construction space. Further, an efficient manufacturing becomes possible. It is to be understood that the connection principle including the first connector part 178 and the second connector part 180 can also be used independently of the design of the channel element 22 as illustrated in the other figures and as described herein and/or in other application areas.

As illustrated, the antenna 106 and the calculation unit 104 can be integrated in an assembly and, e.g., be arranged on a common printed circuit board. For mechanical protection this assembly can be hosted within a casing or the like. The connection of the calculation unit 104 (and the antenna 106) to the first cable 114 and/or the second cable 118 can be established via a first connector part 178 on the side of the calculation unit 104. As illustrated, this first connector part 178 can include a printed circuit board 184. In particular, this printed circuit board 184 can accommodate the calculation unit 104. In the illustrated embodiment the first connector part 178 includes four pogo pins 188 for establishing the electric connection when the second connector part 180 is screwed to the first connector part 178. The pogo pins 188 are spring-loaded pins for establishing an electric connection and providing a durable and resilient electric connection.

In the illustrated embodiment the second connector part 180 also includes a printed circuit board 186 having a hole 192 for the screw 182. As illustrated, the screw is (optionally) fixed by means of a clip 194 to prevent a loss of the screw 182, when the second connector part 180 is not in connection with the first connector part. The first connector part 178 can include a threaded connector 190 that is designed for receiving the screw 182.

The two connector parts 178, 180 are screwed together by means of a screw 182. In the illustrated embodiment the screw is configured for manual operation by without a screw driver by means of a hinged clamp 196 attached to the screw 182.

Between the two connector parts 178, 180 a sealing (not illustrated) can be arranged to protect the actual conductors from moisture. It is possible to design at least one of the two connector parts 178, 180 to hold this sealing in place, also while not being connected.

Herein, the different circuitries are in particular described with respect to their function. This functionality can be obtained by soft- and/or hardware. For instance, it is possible that the respective functionality is partly or completely implemented in a software running on a microcontroller. Thus, each calculation unit may include a microcontroller implementing the respective functions either alone or in communication and interaction with further passive or active electrical components such as resistors, capacitors and inductors.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the description is intended to be illustrative, but not limiting the scope of the disclosure, as well as other claims. The disclosure, including any readily discernible variants of the teachings herein, defines, in part, the scope of the foregoing claim terminology such that no inventive subject-matter is dedicated to the public.

In the claims, the word "comprising" does not exclude other elements or steps, and the indefinite article "a" or "an" does not exclude a plurality. A single element or unit may fulfill the functions of several items recited in the claims. The mere fact that certain measures are recited in mutually different dependent claims does not indicate that a combination of these measures cannot be used to advantage.

The elements and units of the disclosed apparatuses, devices, circuitry and system may be implemented by corresponding hardware and/or software elements, for instance appropriated circuits. A circuit is a structural assemblage of electronic components including conventional circuit elements, integrated circuits including application-specific integrated circuits, standard integrated circuits, application-specific standard products, and field programmable gate arrays. Further a circuit includes central processing units, graphics processing units, and microprocessors which are programmed or configured according to software code. A circuit does not include pure software, although a circuit includes the above-described hardware executing software.

The invention claimed is:

1. A decoder for a race timing system, comprising:
   a reader interface for receiving detections of sports timing transponders passing an antenna;
   a cable connection interface for connecting a network cable and/or a computer interface cable;
   a user interface for providing configuration feedback to a user;
   a processing unit for determining passing times of participants in a sports event based on the detections; and
   a housing for protecting the processing unit from environmental impact, wherein
   the user interface is included in the decoder and is arranged on a top side of the housing and on an outside of the housing for providing user access and the cable connection interface is arranged under a protective flap that is configured to provide user access to the cable connection interface in an open state and to shield the cable connection interface from environmental impact in a closed state.

2. The decoder as claimed in claim 1, wherein the reader interface includes
   a passive RFID connector for connecting to RFID reader circuitry having an antenna connected thereto and for receiving detections of passive sports timing transponders from the RFID reader circuitry; and/or
   a loop antenna connector for connecting to an induction loop for communicating with active sports timing transponders.

3. The decoder as claimed in claim 1, wherein the protective flap
   is configured to cover an upper portion of a front side of the housing and is pivotably hinged about a pivot axis substantially parallel to a top side of the housing and a front side of the housing; and/or
   has a curved shape, in particular spanning an angle of about 90°.

4. The decoder as claimed in claim 1, wherein the user interface includes a water-resistant display.

5. The decoder as claimed in claim 1, wherein
   a lower portion of the protective flap is configured to cover a section of the housing below the cable connection interface in the closed state; and/or
   the housing includes a brush extension reaching to a lower portion of the protective flap in the closed state for allowing a network cable and/or a computer interface cable to pass through the brush extension to connect to the cable connection interface albeit maintaining a barrier for environmental impact, in particular splash water.

6. The decoder as claimed in claim 1, wherein the housing includes a top connection portion in an area of the top side of the housing and a matching bottom connection portion in the area of a bottom side of the housing for allowing a stackability of multiple decoders.

7. The decoder as claimed in claim 1, wherein
   the housing includes two battery compartments for housing two batteries and a battery fixation mechanism configured to fixate a battery in a first battery compartment while allowing a replacement of a battery in a second battery compartment;
   the battery fixation mechanism includes two further protective flaps for closing the two battery compartments and a closing element for securing the further protective flaps in a closed state;
   said closing element is configured to simultaneously close both further protective flaps to fixate two batteries in the two battery compartments in a first position and selectively close one of the further protective flaps while opening the other of the further protective flaps in a second and third position to fixate one battery while allowing a replacement of the other.

8. The decoder as claimed in claim 7, wherein the two further protective flaps
   are transparent to allow the user to visually assess a presence and/or a charging state indication of batteries in the two battery compartments; and/or
   are arranged on a same side of the decoder as the protective flap.

9. The decoder as claimed in claim 1, including a ventilation unit for ventilating an inside of the housing with outside air, wherein
   a ventilation strength is controlled based on a reading of a temperature sensor and a humidity sensor included in the decoder.

10. The decoder as claimed in claim 1, including a ventilation outlet connecting an inside of the housing with an outside and a ventilation inlet connecting the outside with the inside, wherein
    the ventilation outlet and the ventilation inlet are arranged under the protective flap.

11. The decoder as claimed in claim 1, including an RFID chip for carrying information on the decoder, in particular an identification information for identifying the decoder.

12. The decoder as claimed in claim 1, including a bumper element for placing the decoder on an underlying surface, said bumper element having a protrusion on a side of the housing opposite to the side of the protective flap so that placing the decoder in a position in which the cable connection interface faces upwards will cause the decoder to tip over.

13. The decoder as claimed in claim 1, wherein the processing unit is configured to synchronize operation of multiple RFID reader circuitries connected in a daisy chain via the reader interface.

14. The decoder as claimed in claim 1, including
    an active RFID reader processing circuit for determining passing times of active sports timing transponders;
    a heating unit for heating a battery in a battery compartment; and/or
    a communication unit for communicating via a mobile communication network having a first SIM module for receiving a first physical or virtual SIM card and a second SIM module for receiving a second physical or virtual SIM card.

15. A race timing system comprising:
a decoder as claimed in claim 1; and
a detection assembly including an antenna and a calculation unit connected to the antenna, said antenna and calculation unit being positioned in a channel element, wherein said calculation unit includes RFID reader circuitry.

* * * * *